Figure 3:
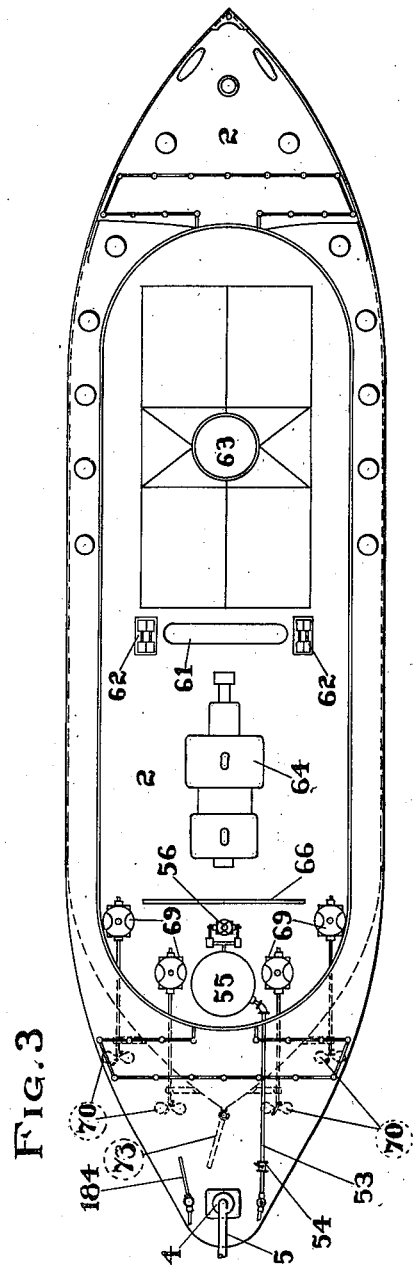

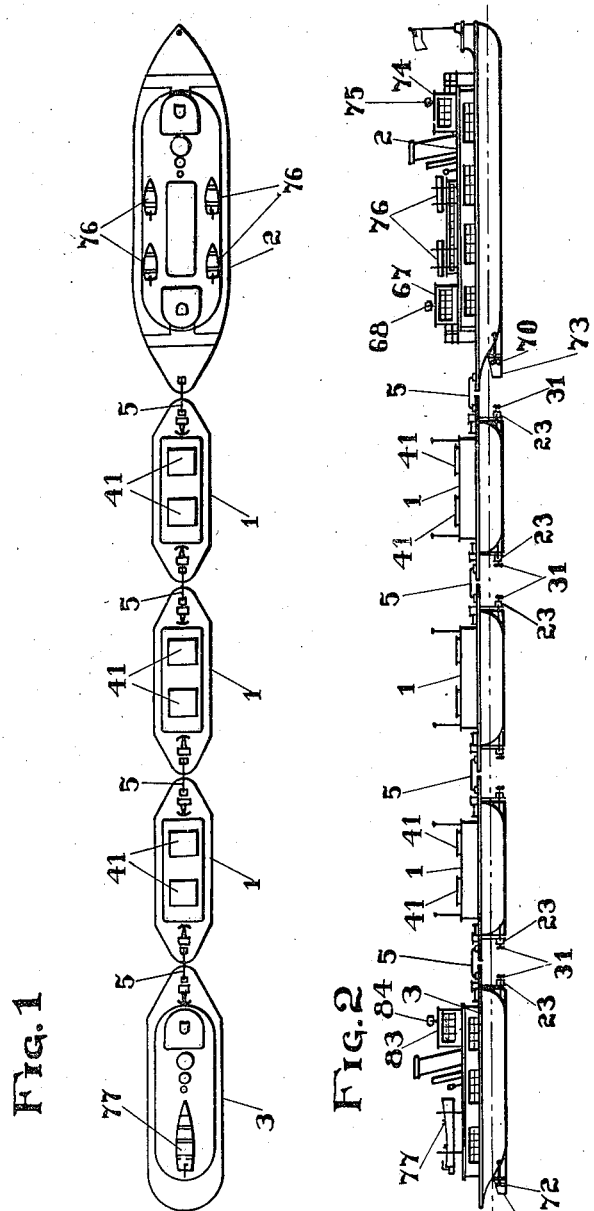

W. R. MACKLIND.
HYDROTRAIN.
APPLICATION FILED SEPT. 15, 1910.

1,014,313.

Patented Jan. 9, 1912.
10 SHEETS—SHEET 2.

Witnesses:
Archer W. Richards.
George G. Anderson.

Inventor:
WILLIAM R. MACKLIND,
By Hugh K. Wagner,
His Attorney.

W. R. MACKLIND.
HYDROTRAIN.
APPLICATION FILED SEPT. 15, 1910.

1,014,313.

Patented Jan. 9, 1912.
10 SHEETS—SHEET 3.

Witnesses:
Archer W. Richards.
George G. Anderson.

Inventor:
WILLIAM R. MACKLIND,
By Hugh K. Wagner
His Attorney.

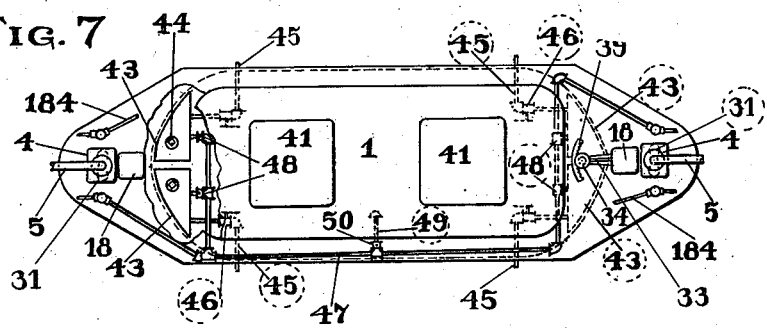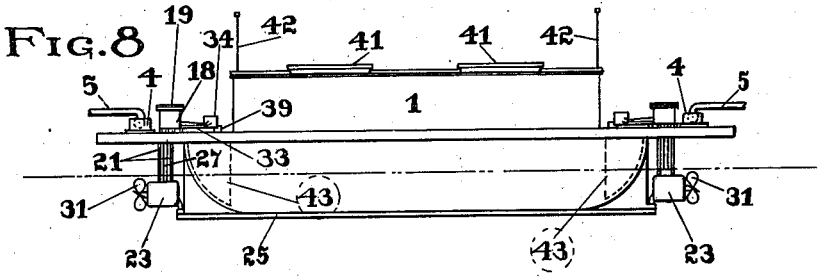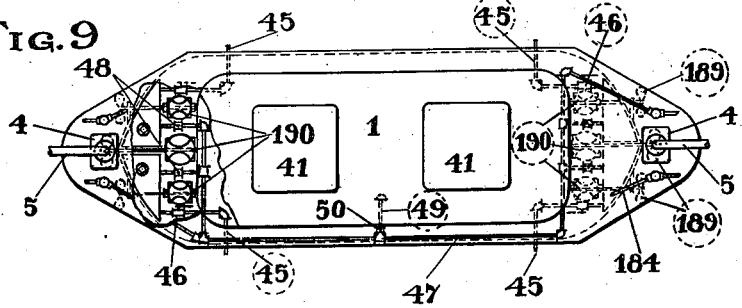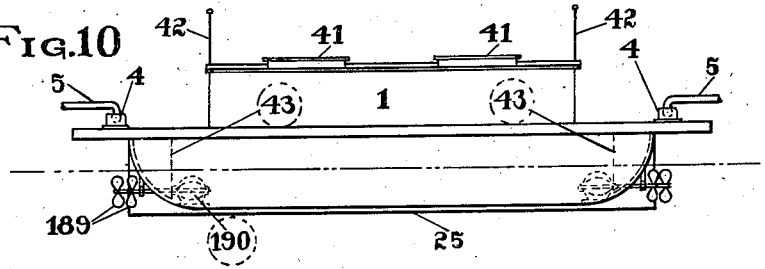

W. R. MACKLIND.
HYDROTRAIN.
APPLICATION FILED SEPT. 15, 1910.

1,014,313.

Patented Jan. 9, 1912.
10 SHEETS—SHEET 5.

Witnesses:
Archer W. Richards.
George G. Anderson.

Inventor:
WILLIAM R. MACKLIND,
By Hugh K. Wagner,
His Attorney.

W. R. MACKLIND.
HYDROTRAIN.
APPLICATION FILED SEPT. 15, 1910.

1,014,313.

Patented Jan. 9, 1912.
10 SHEETS—SHEET 6.

Witnesses:
Ascher W. Richards
George G. Anderson

Inventor:
WILLIAM R. MACKLIND,
By Hugh K. Wagner
His Attorney.

W. R. MACKLIND.
HYDROTRAIN.
APPLICATION FILED SEPT. 15, 1910.
1,014,313.
Patented Jan. 9, 1912.
10 SHEETS—SHEET 10.
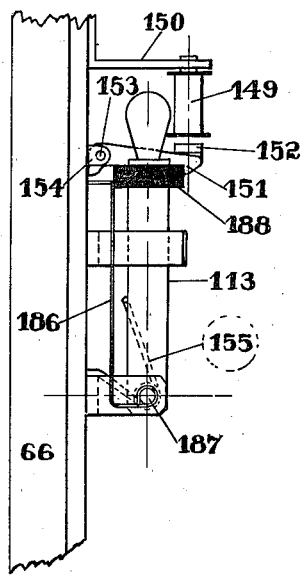
Fig. 18
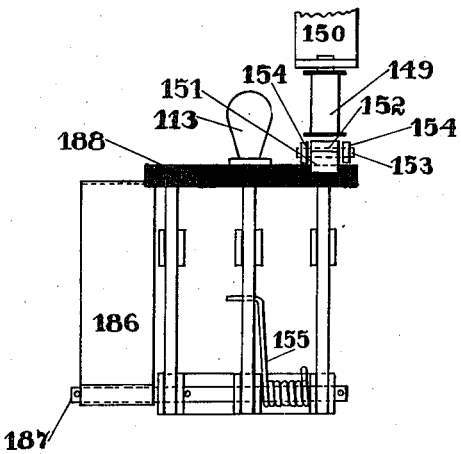
Fig. 19
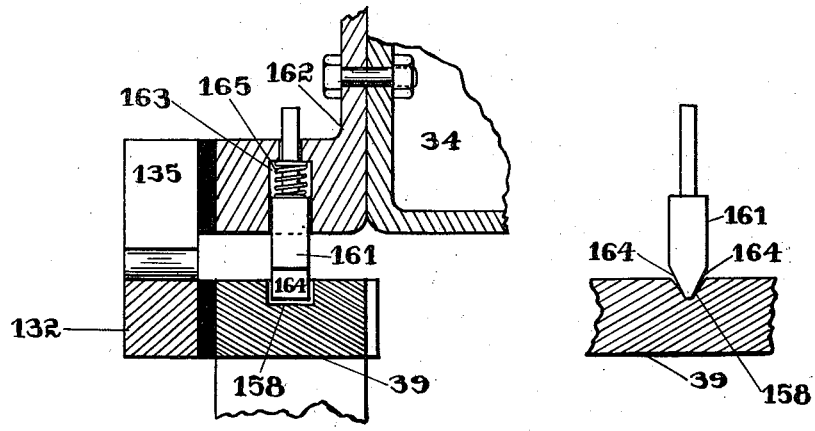
Fig. 20
Fig. 21
Witnesses:
Archer V. Richards.
George G. Anderson.
Inventor:
WILLIAM R. MACKLIND,
By Hugh K. Wagner
His Attorney.

UNITED STATES PATENT OFFICE.

WILLIAM R. MACKLIND, OF MINERAL POINT, MISSOURI.

HYDROTRAIN.

1,014,313.   Specification of Letters Patent.   Patented Jan. 9, 1912.

Application filed September 15, 1910. Serial No. 582,154.

*To all whom it may concern:*

Be it known that I, WILLIAM R. MACKLIND, a citizen of the United States, residing at the city of Mineral Point, in the county of Washington and State of Missouri, have invented certain new and useful Improvements in Hydrotrains, of which the following is a specification, reference being had therein to the accompanying drawings.

This invention relates to river transportation, and is designed to adapt river transportation to modern conditions, so as to enable competition with railroads and thus to further the use of the natural resources of the country.

River transportation has heretofore suffered under the impediment that a small boat can not carry a cargo equal to a train load, while, on the other hand, large boats require a greater depth of water than is usually found in rivers. For this reason, large expenditures have been proposed for the deepening of river channels and for making and maintaining same of uniform depth. Such expense is so large, however, as to be prohibitive in poor localities and as to be a burden anywhere. It circumscribes, moreover, the number and length of streams thus rendered navigable, because such treatment can not be accorded all the rivers of a country, on account of the excessive expense. The expense of maintenance of channels thus artificially created is, also, enormous, by reason of the fact that work must be continued constantly to prevent deterioration of the artificially-created channel.

The object of this invention is to provide means of transportation adapted to shallow water and which nevertheless shall be possessed of large cargo-carrying capacity. This desideratum is attained by this invention by the combination of a plurality of relatively small boats, which, by reason of their being relatively small, are not of deep draft, and the further combination therewith of a power boat or plurality of power boats.

Preferably, a chain of relatively small boats will be linked together by any suitable means, and a power boat will be attached to the forward end of said chain and another power boat or a mere " drag " boat will be attached to the stern of said chain of boats. Thus, a train of boats will be created somewhat resembling a train of cars on a land railway.

Preferably, this proposed water train will consist of a plurality of units, each of which may contain power and steering devices or from some of which such appliances may be omitted. Preferably, the main power will be derived from machinery contained in the head boat, and preferably the stern boat will likewise contain power appliances, so that in case of disablement of the head boat the stern boat can be used as a substitute therefor. Preferably, the other units of the train will not contain power appliances, but will be adapted to carry the maximum cargo for their size.

Preferably, the stern boat will be adapted and utilized to hold the train taut, or nearly so, in transit, acting as a " drag " to maintain the train in more or less of a straight line. Each of the units will preferably be provided with bow and stern steering appliances, so as to be navigable independently and so as to be adapted to assist in the steering of the train when forming part thereof.

The train may be made up of any desired number of units, and, where necessary, a plurality of power or " drag " boats may be supplied. Part of this invention consists in the combination of a plurality of cargo-carrying units with a suitable source of power and means whereby the movement and steering of the entire train can be regulated (preferably electrically) from a single point. In this connection, it is to be observed that, while the head boat is preferably the power boat, yet, by means of electrical connections, auxiliary power appliances, located on each cargo-carrying unit or other part of the train, may be energized.

Figure 4:
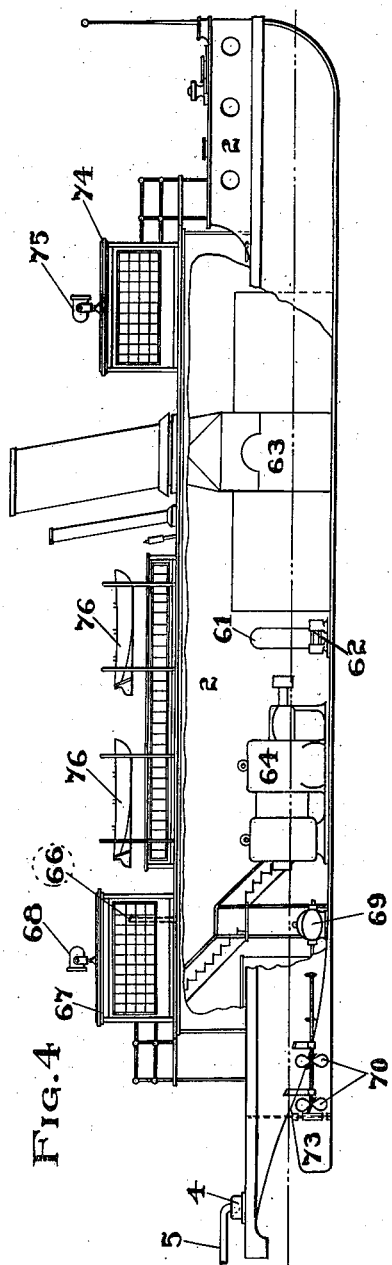
Figure 5:
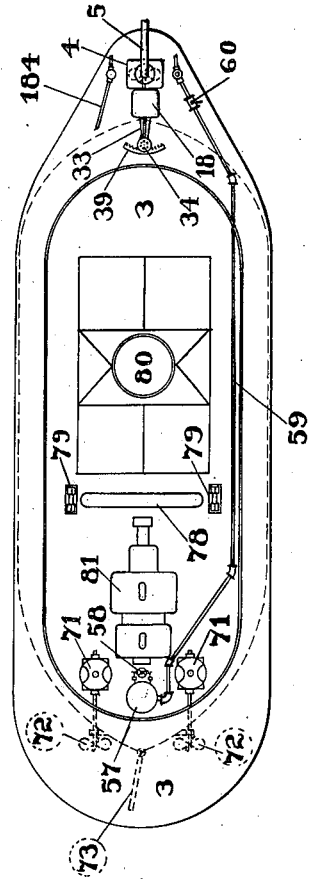
Figure 6:
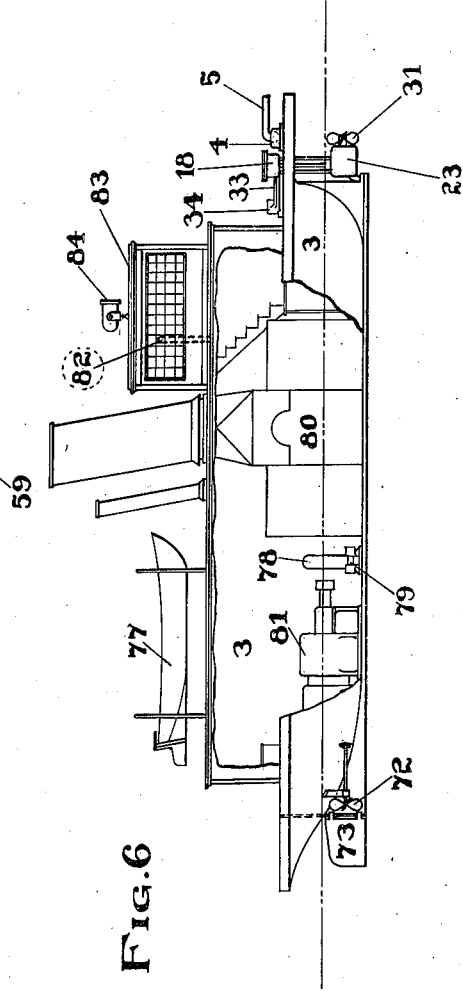
Figure 11:
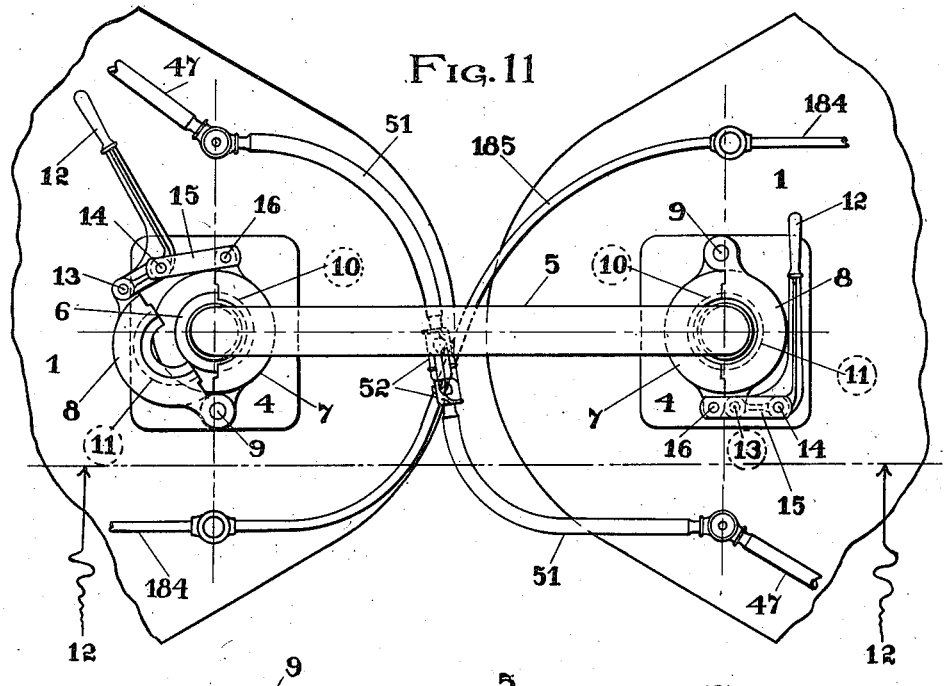
Figure 12:
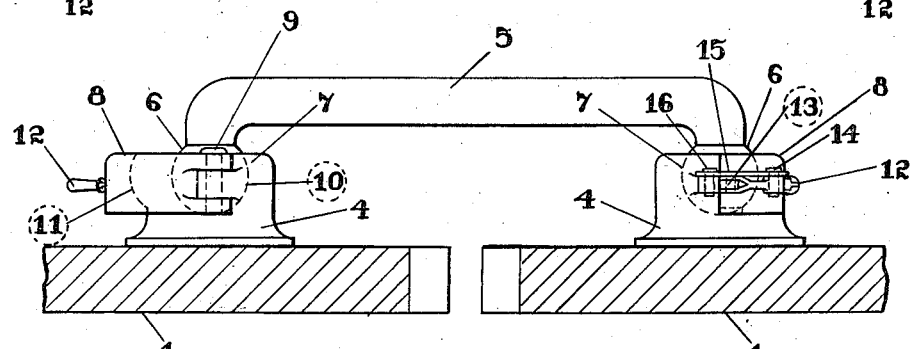
Figure 13:
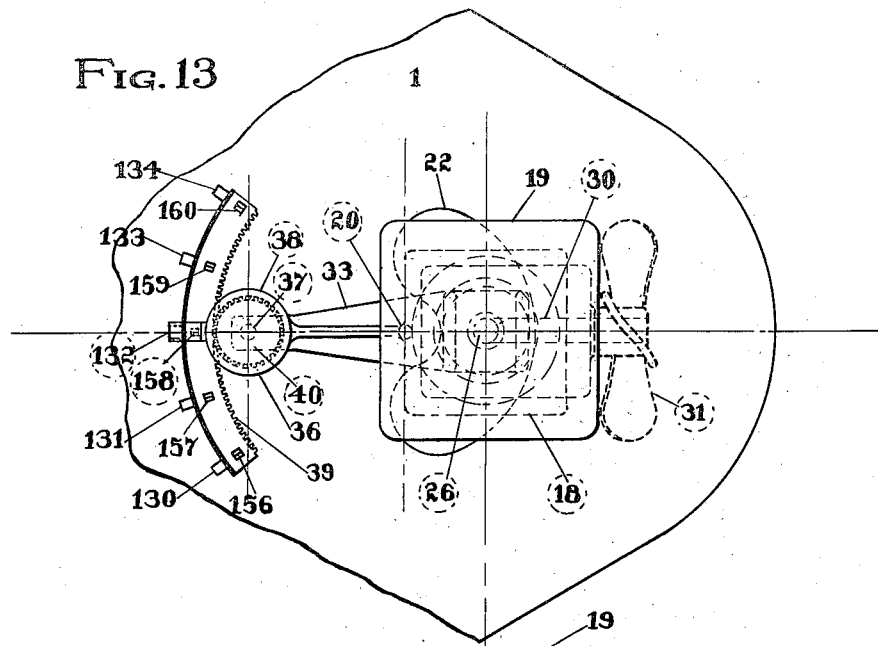
Figure 14:
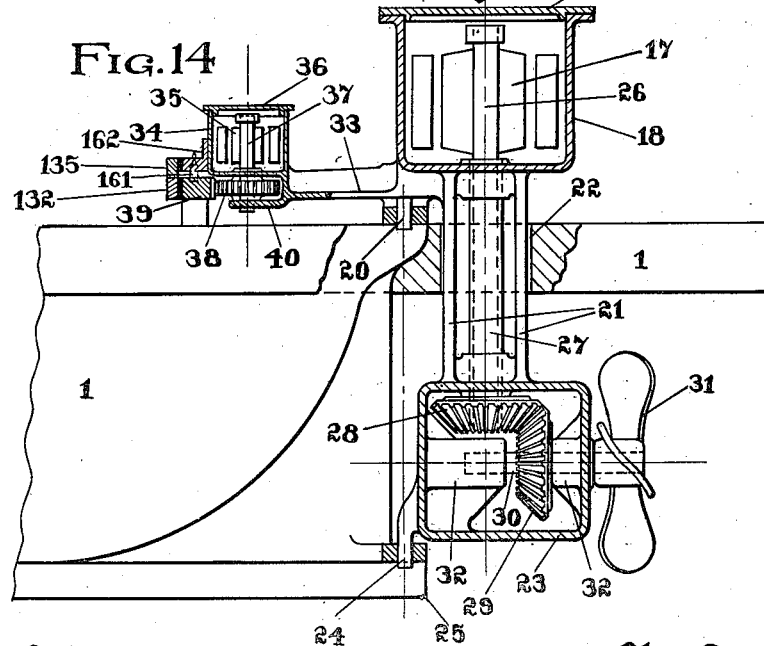
Figure 15:
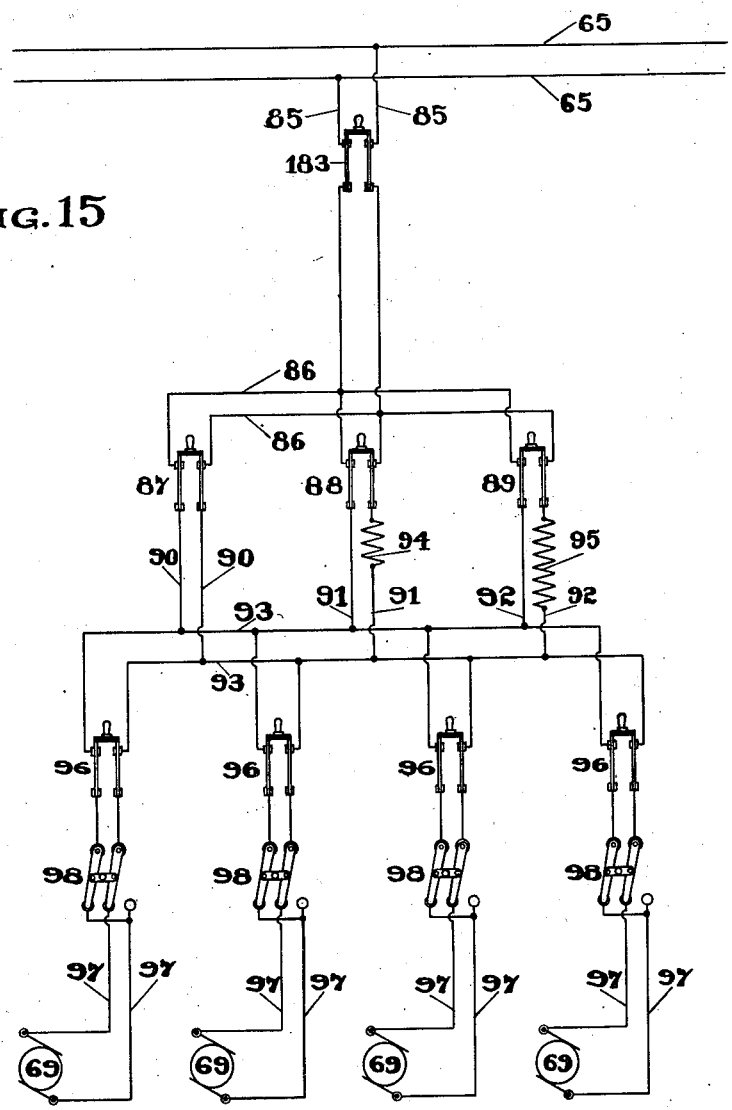
Figure 16:
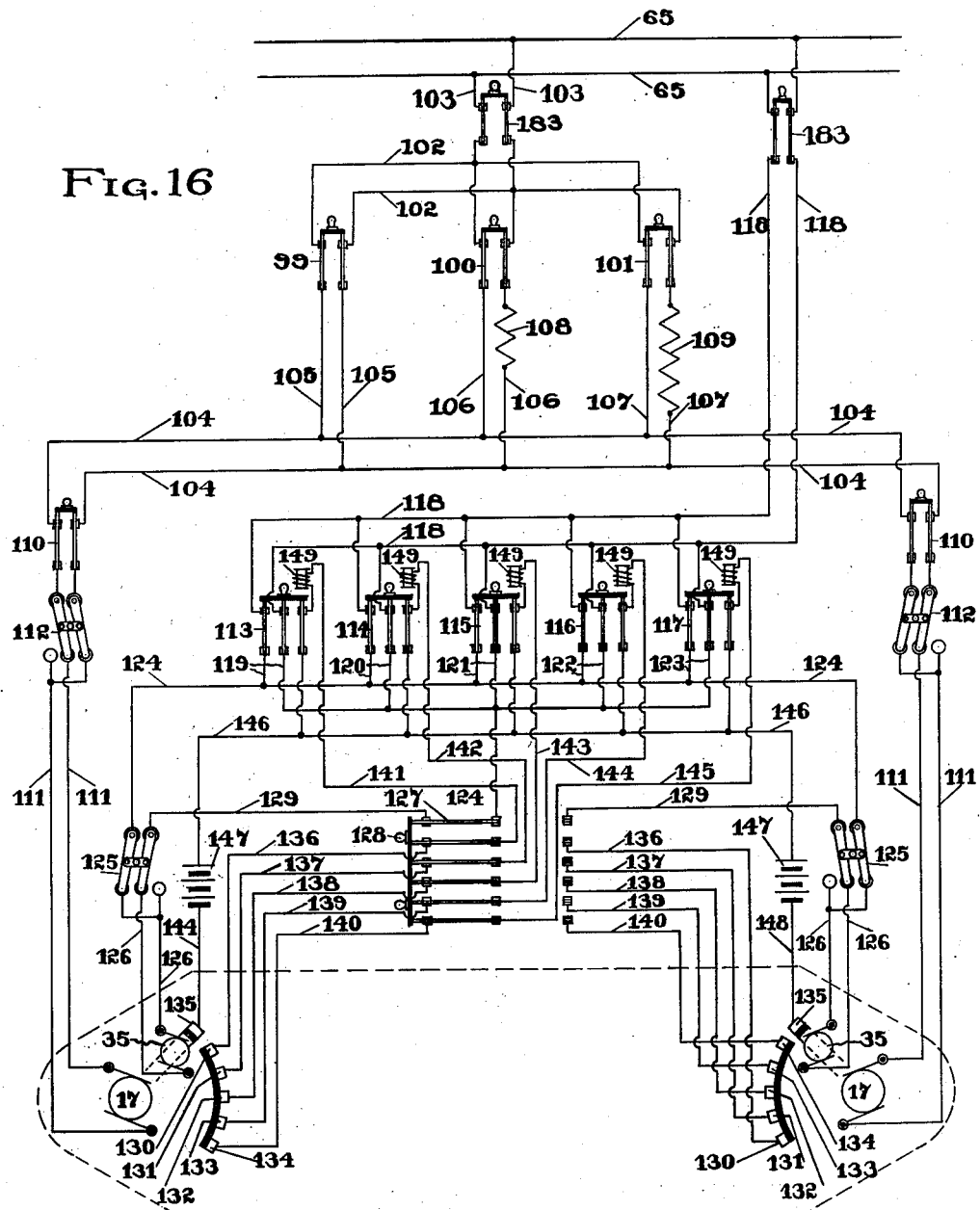
Figure 17:
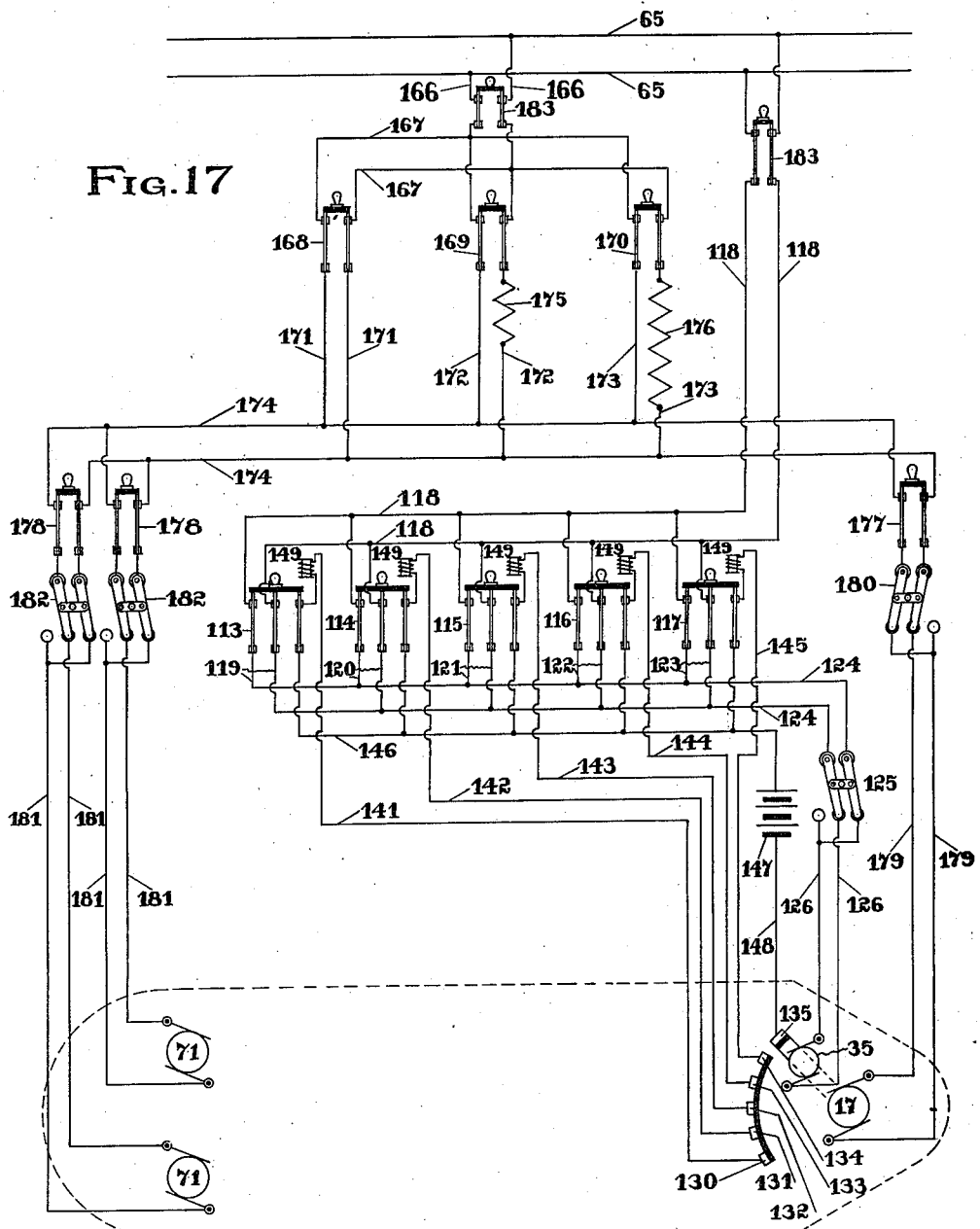

In the drawings forming part of this specification, like numbers of reference denote like parts wherever they occur, and Figure 1 is a diagrammatic top plan view of a water train; Fig. 2 is a diagrammatic side elevation thereof; Fig. 3 is a top plan view of the head or power boat; Fig. 4 is a side elevation thereof, parts being broken away; Fig. 5 is a top plan view of a " drag " or brake boat; Fig. 6 is a side elevation thereof, parts being broken away; Fig. 7 is a top plan view of one of the cargo-carrying units; Fig. 8 is a side elevation thereof; Figs. 9 and 10 are, respectively, top and side elevational views of a modified form of cargo-carrying unit; Fig. 11 depicts in top plan view the connections between any two units of the train; Fig. 12 is a side elevation of the device for coupling two units; Fig. 13 is a top plan view of the steering and propelling means located upon a cargo-carrying unit; Fig. 14 is a sectional view of same; Fig. 15 is a diagrammatic view of the electrical connections for operating the propelling devices of the power boat; Fig. 16 is a diagrammatic view of the wiring for one of the cargo-carrying units; Fig. 17 is a diagrammatic view of the wiring on the brake or "drag" boat; Fig. 18 is a side elevation of a switch upon one of the control boats, there being a plurality of such switches upon each boat; Fig. 19 is a front elevation of an indicator device adapted to be operated by the switch of Fig. 18, there being a plurality of such indicator devices on each switch board; and Figs. 20 and 21 are detailed views, on an enlarged scale, of a device for holding the rudder of a unit in predetermined positions.

The train comprises a plurality of relatively small cargo-carrying boats or units 1 that are coupled together by any suitable means, a power boat 2 that is attached to the forward end of the train, and a "drag" or brake boat 3 that is attached to the stern of the train.

Each of the coupling devices preferably consists of a pair of boxes 4 and a coupling-link 5 which bears enlarged spherical ends 6. Said boxes 4 are secured by any suitable means to the adjoining ends of a pair of units 1, respectively, or to an end of the power boat 2 and an adjoining end of a unit 1, respectively, or to an end of the brake boat 3 and an adjoining end of a unit 1, respectively. Each box 4 comprises a stationary half 7 and a movable half 8 that is pivoted at 9 to said half 7, said halves 7 and 8 being provided with depressions 10 and 11, respectively, that unite to form a socket when half 8 is moved into engagement with half 7. A lever 12 is pivotally attached at 13 to the half 8 and, also, at 14 to member 15 that is pivoted at 16 to the half 7. This arrangement of lever 12 and member 15 forms a toggle by means of which the half 8 is caused to move away from the half 7, when said lever is moved away from half 8, Fig. 11, thereby allowing an enlarged spherical end 6 of link 5 to be placed between or removed from depressions 10 and 11, but, when said lever is moved toward the half 8, the latter is caused to move into engagement with the half 7 and is hereby locked in engagement with said half 7, in order to hold an enlarged spherical end 6 in the socket formed by the depressions 10 and 11. The enlarged spherical ends 6 of link 5 are not only locked in boxes 4, but are free to rotate either horizontally, vertically, or obliquely, whereby a unit 1 is allowed to swing to either side of a unit or boat attached thereto or same can be loaded to set deeper in the water than an adjoining unit or boat.

Both ends of each unit 1 are equipped with devices for propelling and steering same, said devices being preferably operated with electrical power and arranged to be controlled separately either from the power boat 2 or the brake boat 3 in the manner hereinafter described. The propelling device at an end of unit 1 is operated by means of a motor 17 that is supported in a housing 18, the latter bearing a cover 19 to protect said motor from rain, etc., and being pivotally attached at 20 to the deck of said unit. A pair of members 21 project from the bottom of housing 18 and pass through an opening 22 in the deck of unit 1, said opening being large enough to permit said members to move therein when said housing is rotated on pivot 20. Said members 21 support a hollow casting or rudder 23 that is pivoted at 24 to the keel 25 of unit 1, said pivot 24 being preferably arranged in vertical alinement with pivot 20 so that said rudder and housing 18 rotate on the same axis. The shaft 26 of motor 17 is preferably disposed vertically, and extends through a sleeve 27 that connects housing 18 with rudder 23. The lower end of shaft 26 projects into the interior of rudder 23 and bears a miter gear 28 which meshes with and drives miter gear 29 rigidly mounted on shaft 30, said shaft 30 projecting from said rudder and bearing a screw propeller 31, which is caused to rotate, when motor 17 is set into operation. Said shaft 30 is journaled in lugs 32 borne by rudder 23 and is so arranged relative to shaft 26 that miter gear 29 remains in mesh with miter gear 28 when said rudder is rotated in either direction on pivot 24. An arm 33 projects from housing 18 and bears a housing 34 in which a motor 35 is supported, said housing bearing a cover 36 to protect said motor. The shaft 37 of motor 35 extends through the bottom of housing 34 and bears a gear wheel 38 that meshes with a segmental rack 39, secured to the deck of unit 1, the lower end of said shaft being journaled in member 40 that projects from arm 33. When the circuit of motor 35 is closed in the manner hereinafter described, said motor is set into operation and thereby causes gear 38 to travel toward the right or left along rack 39 (depending upon the direction in which said motor is caused to rotate), with the result that housing 18 and rudder 23 are caused to rotate simultaneously on pivots 20 and 24, respectively, in order to move rudder 23 and propeller 31 to a central position, as depicted in Fig. 13, or to set said rudder and propeller either to port or to starboard. This arrangement affords a more efficient steering means than when only the rudder is allowed to move.

Each unit 1 is provided with a hatch 41 or a plurality of such hatches to allow the hold of said unit to be loaded with cargo, each hatch being arranged so that, when same is closed, the hold of the unit is airtight. Each end of said unit bears a staff 42, or the like, to which a flag or a light can be attached when the train is navigating in the day-time or night-time, respectively. A plurality of equalizing tanks 43 are preferably located in the hold of unit 1 and afford means by which said unit can be balanced in case one side of the hold is loaded with a greater weight of cargo than the opposite side thereof. Each tank 43 is provided with a plug 44 which, when removed, allows said tank to be filled with water. An outlet pipe 45 is connected to the lower part of tank 43 in order to allow the water to discharge from said tank, and contains a valve 46. An air-pipe 47 extends from one end of unit 1 to the other end thereof and is connected to the tanks 43, each connection containing a valve 48 that controls the passage of compressed air into a tank 43 in order to force the water out of same. In case a unit 1 is loaded so that one side sets lower in the water than the other side thereof, the tanks 43 adjacent the side having the lighter load are filled with enough water to balance the unit. If it is desired to empty a tank 43 containing water, valve 46 of its outlet pipe 45 and valve 48 that controls the passage of compressed air into said tank are opened, with the result that compressed air passes into said tank and forces the water to discharge through said pipe 45. A branch pipe 49 is connected to pipe 47 and is arranged to project into the interior of the hold of unit 1 in order to discharge compressed air into said hold, the passage of air through said pipe 49 being controlled by means of a valve 50. In case a unit 1 springs a leak, the hatches 41 are closed and the valve 50 is opened to allow the hold of the unit to be filled with compressed air, with the result that water is prevented from flowing into the hold of the unit, and the tanks 43 are filled with compressed air in order to increase the buoyancy of the unit, thereby preventing the unit from sinking. The ends of pipe 47 are connected to flexible pipes 51, respectively, each pipe 51 being provided with an ordinary air-hose coupling 52 to afford a means for attaching same to a pipe 51 of an adjoining unit. The pipe 47 on the forward unit 1 is connected to pipe 53 on the power boat 2, said pipe 53 containing a valve 54 and being attached to an air-compressor 55 in which air is compressed by means of power obtained from a motor 56, or the like. An auxiliary air-compressor 57, in which air is compressed by means of a motor 58, or the like, is located on the brake boat 3 and is intended to be utilized in case the compressor 55 on the power boat 2 becomes disabled. The pipe 47 on the unit 1 at the stern of the train is connected to pipe 59 on the brake boat 3, said pipe 59 containing a valve 60 and being attached to the air-compressor 57.

The power boat 2 is equipped with machinery for generating power to operate the train. Said machinery preferably consists of a condenser 61, pumps 62, and a boiler or boilers 63 for generating steam to drive the electric generator 64 which is electrically connected to the bus wires 65 of the switchboard 66, said switchboard being located in the pilot house 67 at the stern of the power boat 2. The pilot house 67 is arranged so that the switchboard operator can watch the units 1 and the brake boat 3, and supports a search-light 68 that affords a means for throwing light upon said units and said brake boat at night. The switchboard operator actuates switches on switchboard 66, in the manner hereinafter described, in order to control the movements of the units 1 and, also, switches to operate motors 69 that drive propellers 70 on the power boat 2 and motors 71 that drive propeller 72 on the brake boat 3. The power boat 2 is steered by means of a rudder 73 that is actuated in the usual manner by a steering-wheel (not shown in the drawings) located in the pilot-house 74 at the bow of said power boat. Said power boat carries a headlight 75 to be used at night and, also, a life-boat 76 or a plurality of same.

The brake boat 3 carries a life-boat 77 or a plurality of same, and is equipped with machinery that preferably comprises a condenser 78, pumps 79, a boiler or boilers 80, and an electric generator 81, and, also, a switchboard 82 that is located in the pilot-house 83 at the bow of said brake boat, said machinery being intended to be utilized in case the machinery on the power boat 2 becomes disabled, or when the brake boat is uncoupled from the train and operated separately. The switchboard 82 is preferably wired in the same manner as the switchboard 66, as hereinafter described, so that the motors 17 and 35 on the units 1 and brake boat 3, the motors 69 on the power boat 2, and the motors 71 on the brake boat 3 can be operated therefrom.

A propeller 31 and a rudder 23 are attached to the bow of the brake boat 3, and afford means for backing the train or for holding the train taut, or nearly so. Said brake boat is, also, provided with a rudder 73 for the purpose of steering same.

The switchboards 66 and 82 are provided with bus wires 65, respectively, the wires 65 of switchboard 66 being connected to generator 64, and the wires 65 of switchboard 82 being connected to generator 81. In Figs. 15, 16, and 17, the electrical connections of one of the switchboards are depicted and it should be understood that the other switchboard is equipped with similar connections.

In Fig. 15 the electrical connections for operating the motors 69 of the power boat 2 are depicted, and comprise the following: Wires 85 lead from the bus wires 65 to wires 86. Switches 87, 88, and 89 are connected in parallel to wires 86, and control the main circuits and, also, the speeds of motors 69. Wires 90, 91, and 92 lead from switches 87, 88, and 89, respectively, to wires 93, said wires 91 and 92 being connected to resistance coils 94 and 95, respectively. Switches 96 are connected in parallel to wires 93, there being as many switches 96 as there are motors 69 so that said motors can be operated separately. Said switches 96 control the circuits of the several motors 69 and are connected with the latter by means of wires 97, respectively, each of said circuits being provided with a pole changer 98 so that its motor 69 can be operated forward or backward. When the circuit of a motor 69 is closed by its switch 96, said motor is caused to run at high speed if the main circuit is closed by switch 87, at a slower or intermediate speed if the main circuit is closed by switch 88, or at a still slower or low speed if the main circuit is closed by switch 89.

In Fig. 16 a set of electrical connections for operating the motors 17 and 35 of a unit 1 is shown, and it should be understood that each switchboard is equipped with as many of such sets as there are units 1. Switches 99, 100, and 101 are connected in parallel to wires 102, said wires 102 being connected to wires 103 that lead from bus wires 65. Said switches 99, 100, and 101 control the main circuits and, also, the speed of the motors 17, and are connected to wires 104 by means of wires 105, 106, and 107, respectively, said wires 106 and 107 being connected to resistance coils 108 and 109, respectively. Wires 104 are connected to a pair of switches 110, said switches being connected to motors 17 by means of wires 111, respectively. One of the switches 110 controls the circuit of the motor 17 at the bow of a unit 1 and the other controls the circuit of the motor 17 at the stern of said unit, and each of said circuits are provided with a pole changer 112 so that its motors 17 can be run forward or backward. If the circuit of a motor 17 is closed by its switch 110, said motor runs at high speed when the main circuit is closed by switch 99, at a slower or intermediate speed when the main circuit is closed by switch 100, or at a still slower or low speed when the main circuit is closed by switch 101. Multiple switches 113, 114, 115, 116, and 117 are connected in parallel to wires 118 that lead from bus wires 65. Wires 119, 120, 121, 122, and 123 lead from switches 113, 114, 115, 116, and 117, respectively, to wires 124. The ends of one wire 124 are connected to pole changers 125 from which wires 126 lead to motors 35, respectively, and another wire 124 is connected to a middle terminal to which bar 127 of a double-throw multiple switch 128 is pivoted. Wires 129 connect the pole changers 125 with the terminals of switch 128 that aline with bar 127, and complete the circuits of motors 35, respectively.

Each rack 39 is provided with contact springs 130, 131, 132, 133, and 134, or the like, that are insulated therefrom, said springs being equal in number to switches 113, 114, 115, 116, and 117 and, also, to the positions of a rudder 23. Said springs are located in the path of travel of a contact-arm 135 borne by housing 34 of a motor 35, said arm 135 being insulated from said housing. Wires 136, 137, 138, 139, and 140 connect switch 128 with contact-springs 130, 131, 132, 133, and 134, and wires 141, 142, 143, 144, and 145 lead from said switch 128 to switches 113, 114, 115, 116, and 117, respectively. A wire 146 connects switches 113, 114, 115, 116, and 117 with a battery 147 from which wire 148 leads to contact-arm 135 to complete the circuit of said battery. Electro-magnets 149 are located in the circuits of wires 141, 142, 143, 144, and 145, respectively, and are supported by means of brackets 150, or the like. Hooks 151 are arranged adjacent switches 113, 114, 115, 116, and 117, respectively, and afford means for holding said switches in closed positions. Each hook 151 is provided with an armature 152 and is pivoted at 153 to brackets 154, or the like. Armature 152 is located in the field of an electro-magnet 149 so that, when the circuit of said magnet is closed, said armature is drawn by said magnet, with the result that the hook 151 attached to said armature releases a switch adjacent thereto, thereby allowing said switch to be pulled open by a spring 155.

When it is desired to operate the motor 35 at the stern of unit 1, the switch 128 is closed by moving same toward the left, Fig. 16, but when the motor 35 at the bow of said unit is to be operated, said switch is closed by moving same toward the right. When a rudder 23 is to be set at any desired position, the switch that controls the circuit of the motor 35 that operates said rudder and, also, the circuit of the contact-spring to which the contact-arm 135 is to be moved to cause said rudder to occupy the desired position is closed, and the pole changer 125 in the circuit of said motor is set to cause said motor to rotate so that its gear 38 travels along a rack 39 and, also, in the direction of said contact-spring until said contact-arm engages said contact-spring, at which time the circuit of a battery 147 is closed automatically, whereby the electromagnet 149 that is located in said battery circuit draws a hook 151 out of engagement with the closed switch, with the result that said switch is pulled open by its spring 155. For example, if it is desired to move the rudder 23 at the stern of unit 1 from a starboard position to a central position, Fig. 16, the switch 116 is closed and the pole changer 125 in the circuit of motor 35 at the stern of said unit is set to cause said motor to rotate counter-clockwise, whereby the gear 38 of said motor travels toward the center of rack 39 and causes the contact-arm 135 to move toward contact-spring 132. When said contact-arm engages contact-spring 132, the circuit of the electro-magnet 149 above switch 115 is closed, with the result that said magnet draws its hook 151 out of engagement with switch 115, whereby said switch is pulled open by its spring 155 and the circuit of motor 35 is broken automatically in order to stop said rudder in the central position. If said rudder is to be moved either from a central position or a port position to the second position toward starboard, switch 113 is closed and the pole changer 125 in the circuit of motor 35 for operating said rudder is set so that said motor rotates clockwise and thereby causes its gear 38 to travel toward port in order to move the contact-arm 135 toward contact-spring 130. When said contact-arm reaches contact-spring 130, the circuit of the electro-magnet 149 above switch 113 is closed, whereby said magnet draws its hook 151 out of engagement with said switch, with the result that said switch is pulled open by its spring 155 and the circuit of said motor 35 is broken automatically in order to stop said rudder at the second position toward starboard.

In order to hold rudders 23 in any desired positions, each rack 39 is provided with notches 156, 157, 158, 159, and 160, said notches being preferably located adjacent the contact-springs 130, 131, 132, 133, and 134, respectively, and arranged in the path of travel of a plunger or latch 161 borne by member 162 that is attached to housing 34 of a motor 35. Plunger 161 is reciprocatively mounted in an opening 163 in member 162, and opposite sides of the point of said plunger are beveled at 164 to allow said plunger to enter said notches, a spring 165 being arranged to exert its pressure against said plunger in order to cause same to enter said notches. By this arrangement when a rudder 23 occupies a position so that its contact-arm 135 engages one of its contact-springs, plunger 161 seats in a notch adjacent said contact-spring and thereby holds said rudder in said position and prevents the water from moving said rudder out of said position, but, when the circuit of motor 35 for operating said rudder is closed to move said rudder to a new position, as hereinabove described, the gear 38 moves along rack 39 and thereby causes plunger 161 to move out of said notch and to travel with housing 34 until the contact-arm 135 reaches the contact-spring that causes the rudder 23 to stop in the new position, whereby plunger 161 enters the notch adjacent said last-mentioned contact-spring and holds said rudder in the new position.

In Fig. 17 the electrical connections for operating the motors 17, 35, and 71 of the brake boat 3 are depicted, the wiring for motor 17 being the same as the wiring for motors 17 of a unit 1, as hereinabove described, with the exception that switch 128, a pole changer 125, a battery 147, and wires 129, 136, 137, 138, 139, and 140 are omitted entirely, the wires 141, 142, 143, 144, and 145 leading from switches 113, 114, 115, 116, and 117 being connected to contact-springs 130, 131, 132, 133, 134, respectively, and both wires 124 leading from said switches 113, 114, 115, 116, and 117 to pole changer 125. Wires 166 lead from bus wires 65 to wires 167 to which switches 168, 169, and 170 are connected in parallel. Wires 171, 172, and 173 connect wires 174 with switches 168, 169, and 170, respectively, resistance coils 175 and 176 being connected to wires 171 and 172, respectively. Said switches 168, 169, and 170 control the main circuits and, also, the speeds of motors 71 and 17. A switch 177 and switches 178 are connected in parallel to wires 174. Switch 177 is connected to motor 17 by means of wires 179 to which a pole changer 180 is connected to operate the motor 17 forward or backward. Wires 181 complete the circuits between switches 178 and motors 71, respectively, and each of said circuits contains a pole changer 182 so that its motor 71 can be operated forward or backward. When switches 178 and 177 are closed, the motors 71 and 17 run at high speed if switch 168 is closed, at a slower or intermediate speed if switch 169 is closed, and at low speed if the switch 170 is closed.

Switches 183 are located in the circuits of wires 85, 103, 118, and 166 of switchboards 66 and 82 and, when the train is operated from switchboard 66, all of the switches 183 of said switchboard 66 are closed and the switches 183 of switchboard 82 are opened, but, when the train is operated from switchboard 82 all of the switches 183 of switchboard 82 are closed and switches 183 of switchboard 66 are opened. The units 1, power boat 2, and brake boat 3 are provided with cables 184, respectively, that contain the wires that lead from motors 17 and 35 of units 1 and from motors 17, 35, and 71 of brake boat 3 to switchboard 66 and, also, the wires that lead from motors 17 and 35 of units 1 and from motor 69 of power boat 2 to switchboard 82. The cables 184 of units 1 are connected to one another by means of detachable cables 185, and, in like manner, the cable 183 of the forward unit 1 and cable 184 of the unit 1 at the stern of the train are connected to cables 184 of power boat 2 and brake boat 3, respectively, each cable 185 containing the same number of wires as are in a cable 184. The detachable cables 185 afford means to allow the cable 184 of a unit 1 to be disconnected from adjoining cables 184 when said unit is to be uncoupled from the train, and, also, to allow the cable 184 of a unit 1 to be connected to adjoining cables 184, when said unit is to be coupled to the train.

In order that the switchboard operator can observe what positions the rudders 23 of the several units 1 and brake boat 3 occupy, each of the switches 113, 114, 115, 116, and 117 is provided with an indicator 186. Said indicator is loosely mounted on rod 187 of its switch and is arranged to project into the path of movement of the insulated end 188 of said switch so that, when said switch is closed, said insulated end raises said indicator into position to lean against its switchboard and, when said switch is pulled open by its spring 155, as hereinabove described, said indicator remains in its raised position, thereby indicating what position the rudder 23 occupies that is operated thereby. If the operator desires to move a rudder 23 to a new position, the raised indicator 186 is lowered by the operator and the appropriate switch for moving said rudder to the new position is closed, whereby another indicator is raised, as just described, to indicate the new position of said rudder.

In the alternate form of unit 1, depicted in Figs. 9 and 10, the rudders 23, motors 17 and 35, and propellers 31 are omitted entirely. Each end of said unit is provided with a plurality of propellers 189 that are operated by motors 190, one of said propellers 189 being located centrally of an end of said unit and the other propellers 189 being located adjacent the sides of said end. The motors 190 are connected to switchboards 66 and 82 in the same manner as motors 69 of power boat 2, as hereinabove described, so that same can be operated separately and, also, at high, intermediate, and low speeds. This arrangement of propellers 189 affords means for steering said unit as well as for driving same.

While for the purpose of illustration three units 1 are depicted in the drawings, yet it should be understood that in practice this number can be increased or diminished and each switchboard can be equipped with sufficient connections to operate the maximum number of units that constitutes the train ordinarily. If desired, the propelling and steering devices can be omitted entirely from any or all of the units 1 and the train can be operated by the steering and propelling devices of power boat 2 and brake boat 3. Further it should be understood that, *mutatis mutandis*, gasolene engines or the like (not shown in the drawings) can be substituted for motors 35, 17, 69, and 71 in order to generate power to actuate rudders 23 and propellers 31, 70, and 72, respectively.

The operation of the train is as follows: Steam is generated in boiler 63 on power boat 2 in order to drive generator 64, which generates power to operate the train, and the fires of boiler 80 on brake boat 3 are banked so that steam can be readily generated in said boiler 80 for the purpose of driving generator 81 to generate power to be utilized either to operate the train in case the machinery on the power boat 2 becomes disabled or to operate the brake boat 3 for switching or any other purpose. The pilot in pilot-house 74 steers the power boat 2 and signals by any suitable means to the switchboard operator in pilot-house 67, when the train is operated from switchboard 66, but, when the train is operated from the switchboard 82, the pilot signals to the switchboard operator in pilot-house 83 on brake boat 3. From the signals of the pilot, the switchboard operator knows which propeller or propellers 70 of power boat 2 to operate at the desired speed and, also, which propellers 31 and 72 and rudders 23 to operate, as hereinabove described. The switchboard operator watches the several units 1 from the pilot-house, in which he is stationed, and operates the appropriate rudder or rudders 23 and propellers 31 and 72, in the manner hereinabove described, either to maintain the train in more or less of a straight line or to cause the several units 1 and brake boat 3 to follow the course of the power boat 2, when said power boat is turned toward the right or left, thereby allowing the train to be turned around in midstream in order to travel in the opposite direction. When the train travels up stream, the propellers 70 are operated to pull the train and, if desired, the propellers 31 and 72 can be utilized to aid in operating the train forward. When the train travels down stream the propellers 31 and 72 of the brake boat 3 are operated backward if necessary in order to hold the train taut, or nearly so, and thereby prevent the current of the river from causing the several units to jam against each other.

The units 1 carry cargo to be left at the several ports along the river and, when the train arrives at a port where the cargo of a unit 1 is to be unloaded, said unit is moored to a wharf, or the like. The coupling links 5, air-hose couplings 52, and cables 185 that connect said unit to adjoining units 1 or to boats 2 or 3 are disconnected to allow said unit to remain at said port in order to be unloaded, and the place previously occupied by said unit is filled with another unit that is loaded with cargo to be shipped from said port to another port, the coupling links 5, air-hose couplings 52, and cables 185 of said other unit being connected, as hereinabove described, to the units 1 or boats 2 or 3 adjacent thereto. After a unit 1 that is left at a port is unloaded, said unit is loaded with cargo for another port so that same can be connected to the train, when the latter makes its return trip, and thus a great amount of time is saved for the reason that it is unnecessary for the train to wait at said port until said unit is unloaded and loaded. After a unit 1 is left at a port, the train continues on its trip to deliver the other units to their destinations. If the train enters a canal or a river that is too narrow to allow the train to be turned around in order to travel in the opposite direction, the power boat 2 and brake boat 3 are uncoupled from the train and their positions relative to the train are reversed, i. e., the power boat 2 is coupled to the end that was previously the stern of the train and the brake boat 3 is coupled to the end to which said power boat was coupled.

I claim:

1. A hydro-train including a plurality of boats linked together in chain, propelling means and steering means at each end of each boat, a power boat coupled to one end of the train, a brake boat coupled to the other end of the train, and means whereby said propelling means and steering means of each of said boats may be independently controlled from either the power boat or the brake boat.

2. A hydro-train including a plurality of boats linked together in chain, propelling means and steering means at each end of each boat whereby the boats may have their ends interchangeably used, a power boat coupled to one end of the train, and means whereby said propelling means and steering means may be independently controlled from the power boat.

3. A hydro-train including a plurality of boats linked together in chain, propelling means and steering means at each end of each boat whereby the boats may have their ends interchangeably used, a power boat coupled to one end of the train, a brake boat coupled to the other end of the train, means whereby the steering means and propelling means of each boat may be independently controlled from either the power boat or the brake boat, and means whereby said power boat and said brake boat may be uncoupled from the train to have their respective positions reversed with relation to the train.

4. In combination with a chain of boats arranged in end to end relation, a power boat coupled to one end of the train, steering means and propelling means on each boat, power means on said power boat to operate said steering means and propelling means, and means for controlling the operation of each of said steering means and said propelling means of each boat independently from said power boat.

5. A hydro-train including a plurality of boats arranged in end to end relation to form a chain of boats, propelling means and steering means at each end of each boat whereby the boats may have their ends interchangeably used, a power boat arranged to form a part of the chain, means carried by the power boat to operate the propelling means and steering means of said boats, and means whereby said operating means of the power boat has independent control of the propelling means and steering means of each boat.

6. A hydro-train including a plurality of boats connected in end to end relation, propelling and steering means on each of said boats, a brake boat, and a power boat connected to the end ones of said boats, and means on each of the power and brake boats for independently controlling and operating the propelling and steering means of each of the first named boats.

7. A hydro-train including a plurality of boats connected in end to end relation, a power boat and a brake boat connected to said first mentioned boats, propelling and steering means at each end of each of the first mentioned boats whereby same may be interchangeably used, and means whereby said means of each of the first mentioned boats may be controlled from either the power or brake boat.

8. In combination with a pair of boats, a horizontal coupling link having each of its ends turned downwardly and formed with a spherical head, a divided socket member carried by each boat to receive said spherical heads, and means whereby said socket member divisions may be separated to permit of removal and insertion of said heads.

9. In combination with a pair of boats, a connecting link having a head on each end thereof, a socket member for each head carried by the boats, each socket member consisting of a stationary and a movable part, and means connected to said parts for actuating same to open and closed positions.

10. In combination with a pair of boats, a connecting link therebetween, said link having a spherical head at each end, and a socket member for each head carried by the boats, said members each being composed of two sections movable with respect to one another, and means for operating said sections to open position and for locking same in closed position.

11. In combination with a pair of boats, a connecting link therebetween, said link having a spherical head at each end, and a socket member for each head carried by the boats, said members each being composed of two sections movable with respect to one another, and means for operating said sections to open position and for locking same in closed position, said means including a lever having one end pivoted to one section and movably connected to the other section.

12. In combination with a pair of boats, a connecting link therebetween, said link having a spherical head at each end, and a socket member for each head carried by the boats, said members each being composed of two sections movable with respect to one another, and means for operating said sections to open position and for locking same in closed position, said means including a lever having a right-angled end pivoted to one section, and a member pivoted to the other section, and to said end of the lever, said lever when in locked position occupying a position in engagement with one of said sectors.

In testimony whereof I have hereunto affixed my signature in the presence of two witnesses.

WILLIAM R. MACKLIND.

Witnesses:
 FRANK E. GOFF,
 F. A. VEDINER.